United States Patent
Hirayama et al.

(10) Patent No.: US 9,961,420 B2
(45) Date of Patent: May 1, 2018

(54) OPTICAL DELAY LINE AND ELECTRONIC BUFFER MERGED-TYPE OPTICAL PACKET BUFFER CONTROL DEVICE

(71) Applicant: NATIONAL INSTITUTE OF INFORMATION AND COMMUNICATIONS TECHNOLOGY, Nukui-Kitamachi, Koganei-shi, Tokyo (JP)

(72) Inventors: Takahiro Hirayama, Koganei (JP); Hideaki Furukawa, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 0 days. days.

(21) Appl. No.: 15/121,772

(22) PCT Filed: Jan. 19, 2015

(86) PCT No.: PCT/JP2015/051238
§ 371 (c)(1),
(2) Date: Aug. 26, 2016

(87) PCT Pub. No.: WO2015/129330
PCT Pub. Date: Sep. 3, 2015

(65) Prior Publication Data
US 2017/0013332 A1    Jan. 12, 2017

(30) Foreign Application Priority Data
Feb. 27, 2014  (JP) ................................ 2014-036222

(51) Int. Cl.
*H04J 14/00*   (2006.01)
*H04B 17/00*   (2015.01)
(Continued)

(52) U.S. Cl.
CPC .......... *H04Q 11/0005* (2013.01); *H04L 47/11* (2013.01); *H04L 49/90* (2013.01);
(Continued)

(58) Field of Classification Search
CPC ........... H04Q 11/0005; H04Q 11/0003; H04Q 11/0066; H04Q 2011/004;
(Continued)

(56) References Cited

U.S. PATENT DOCUMENTS 6,657,773 B2 * 12/2003 Chiaroni ............ H04Q 11/0005
                                              359/326
6,836,582 B2 * 12/2004 Penninckx ......... H04Q 11/0005
                                              385/16
(Continued)

FOREIGN PATENT DOCUMENTS

JP   2008-211530 A   9/2008
JP   2012-90244 A    5/2012

OTHER PUBLICATIONS

International Search Report of International Application No. PCT/JP2015/051238 completed Feb. 12, 2015 and dated Feb. 24, 2015 (4 pages).

(Continued)

*Primary Examiner* — Ken N Vanderpuye
*Assistant Examiner* — Abbas H Alagheband
(74) *Attorney, Agent, or Firm* — Pyprus Pte Ltd (57) ABSTRACT

[Problem] To provide an optical packet buffer control device, without making device construction large in scale, that is capable of dynamically responding to traffic and suppressing power consumption.
[Solution] An optical delay line and electronic buffer merged-type optical packet buffer control device having N number of input terminals (11), an optical packet information acquisition unit (13), a plurality of switches (15), a
(Continued)

plurality of delay lines (17), an electronic buffer (19), an output terminal (21), and a buffer control unit (23), wherein the buffer control unit (23) receives packet information and analyzes packet traffic, and exerts control so as not to use the electronic buffer (19) when the packet traffic is equal to or less than a first threshold, or receives information pertaining to the use state of the delay lines and exerts control so as not to use the electronic buffer (19) when the use rate of the delay lines (the percentage of the number of used delay lines relative to the total number of delay lines) is equal to or less than a first threshold pertaining to the use rate. This device can expand capacity by utilizing the electronic buffer at the time of congestion, and can dynamically respond to changes in traffic.

3 Claims, 7 Drawing Sheets (51) Int. Cl.
*H04B 10/08* (2006.01)
*H04Q 11/00* (2006.01)
*H04L 12/801* (2013.01)
*H04L 12/861* (2013.01)
*H04L 12/26* (2006.01)

(52) U.S. Cl.
CPC .......... *H04Q 11/0003* (2013.01); *H04L 43/16* (2013.01); *H04Q 11/0066* (2013.01); *H04Q 2011/002* (2013.01); *H04Q 2011/0011* (2013.01); *H04Q 2011/0039* (2013.01); *H04Q 2011/0041* (2013.01); *H04Q 2011/0073* (2013.01)

(58) Field of Classification Search
CPC ...... H04Q 2011/002; H04Q 2011/0039; H04L 47/11; H04L 43/16; H04L 49/90
USPC .............. 398/45, 51, 54, 24, 82; 385/16
See application file for complete search history.

(56) References Cited

U.S. PATENT DOCUMENTS

| | | | | |
|---|---|---|---|---|
| 7,272,310 B2* | 9/2007 | Maciocco | .......... | H04Q 11/0066 370/351 |
| 7,313,329 B2* | 12/2007 | Yoo | .......... | H04J 14/02 398/58 |
| 7,315,693 B2* | 1/2008 | Ovadia | .......... | H04L 45/04 398/47 |
| 7,693,421 B2* | 4/2010 | Harai | .......... | H04Q 11/0005 398/51 |
| 7,764,882 B2* | 7/2010 | Beacken | .......... | H04J 14/0227 370/352 |
| 8,073,327 B2* | 12/2011 | Mayer | .......... | H04J 14/0227 398/43 |
| 8,150,264 B2* | 4/2012 | Tang | .......... | H04Q 11/0066 370/389 |
| 9,450,698 B2* | 9/2016 | Matsunaga | .......... | H04J 14/0221 |
| 2002/0054732 A1* | 5/2002 | Zheng | .......... | H04Q 11/0005 385/24 |
| 2002/0057861 A1* | 5/2002 | Ge | .......... | H04L 12/56 385/16 |
| 2002/0076142 A1* | 6/2002 | Song | .......... | G02F 1/3137 385/22 |
| 2003/0026525 A1* | 2/2003 | Alvarez | .......... | H04Q 11/0005 385/16 |
| 2003/0133641 A1* | 7/2003 | Yoo | .......... | B82Y 20/00 385/14 |
| 2004/0119838 A1* | 6/2004 | Griffis | .......... | G01S 7/486 348/215.1 |
| 2004/0126057 A1* | 7/2004 | Yoo | .......... | B82Y 20/00 385/16 |
| 2004/0136385 A1* | 7/2004 | Xue | .......... | H04L 45/00 370/401 |
| 2004/0264960 A1* | 12/2004 | Maciocco | .......... | H04Q 11/0066 398/49 |
| 2005/0030951 A1* | 2/2005 | Maciocco | .......... | H04Q 11/0066 370/395.2 |
| 2005/0041970 A1* | 2/2005 | Harai | .......... | H04Q 11/0005 398/51 |
| 2005/0063701 A1* | 3/2005 | Ovadia | .......... | H04Q 11/0066 398/45 |
| 2005/0089327 A1* | 4/2005 | Ovadia | .......... | H04L 45/04 398/47 |
| 2005/0243829 A1* | 11/2005 | Spencer | .......... | H04L 47/2441 370/394 |
| 2007/0086780 A1* | 4/2007 | Islam | .......... | G02B 26/0808 398/45 |
| 2011/0255072 A1* | 10/2011 | Griffis | .......... | G01S 7/486 356/5.01 |

OTHER PUBLICATIONS

Daisaku Shimazaki et al, "Performance of Optical Burst Switching Network Based on Moving Virtual Source", IEICE Technical Report, vol. 105, No. 127, Jun. 16, 2005, pp. 53 to 56

Makoto Iwai et al, "Constitution Method of Fiber Delay Line Buffers with Variable Delay Line for Variable Length Packet", The Transactions of the Institute of Electronics, Information and Communication Engineers (J94-B), No. 1, Jan. 1, 2011, pp. 14 to 23

Hiroyuki Uzawa et al, Energy-Efficient Frame-Buffer Architecture and It's Control Schemes for ONU Power Reduction, Proceedings of Global Telecommunications Conference (GLOBECOM 2011), IEEE, Dec. 5, 2011.

* cited by examiner

OPTICAL DELAY LINE AND ELECTRONIC BUFFER MERGED-TYPE OPTICAL PACKET BUFFER CONTROL DEVICE

TECHNICAL FIELD

The present invention relates to an optical packet buffer control device in which an electronic buffer is provided along with an optical fiber delay line (FDL) buffer and the electronic buffer is used dynamically and which can flexibly respond to an increase in traffic with low power consumption.

BACKGROUND ART

In JP 2008-211530 A (Patent Literature 1), an optical packet buffer control device is disclosed. The optical packet buffer control device includes an optical delay line buffer including a plurality of delay lines.

An amount of delay of each fiber delay line in the optical delay line buffer is constant. Thus, an amount of delay given to an optical packet by the optical delay line buffer is a fixed discrete value. Thus, in a case where optical packets having different lengths reach the optical delay line buffer simultaneously, an excessive delay is given to the optical packets. As a result, there are some void spaces between continuously-outputted packets from the buffer. These spaces decrease link utilization.

Moreover, in order to expand an optical delay line buffer, many delay lines are required. The optical delay line buffer generally controls an amount of given delay by choosing line having enough length to accommodate the packet. Thus, in a case of expanding the optical delay line buffer, long delay lines are necessary and footprint of the buffer becomes large. In addition, signal quality is deteriorated due to long delay lines.

CITATION LIST

Patent Literature

Patent Literature 1: JP 2008-211530 A

SUMMARY OF INVENTION

Technical Problem

Thus, the present invention is to provide an optical packet buffer control device to respond to dynamic traffic changes, while the device is small and energy-efficient.

Solution to Problem

The present invention is basically based on a knowledge that it is possible to effectively respond to an increase in traffic, keep the power consumption low and prevent the footprint becoming too large when an electronic buffer is provided along with an optical fiber delay line (FDL) buffer and the electronic buffer is used flexibly in an optical packet buffer control device.

Figure 1:
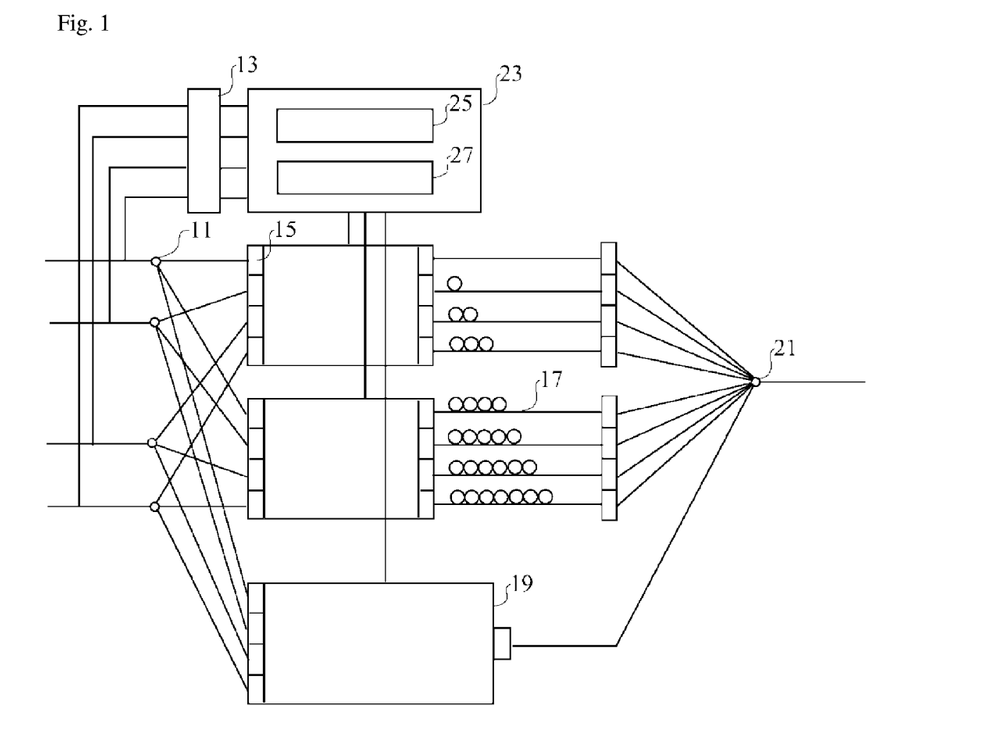
FIG. 1 is a block diagram illustrating a basic configuration example of an optical delay line and an electronic buffer merged-type optical packet buffer control device of the present invention.

The present invention relates to an optical delay line and an electronic buffer merged-type optical packet buffer control device. This device includes N input terminals 11, an optical packet information acquisition unit 13, a plurality of switches 15, a plurality of delay lines 17, an electronic buffer 19, an output terminal 21, and a buffer control unit 23.

Each of the input terminals 11 is an element in which an optical packet is input. The optical packet information acquisition unit 13 is an element connected to N input terminals 11 and that acquires packet information related to an optical packet. The plurality of switches 15 is an element connected to the N input terminals 11. The plurality of delay lines 17 is an element respectively connected to the plurality of switches 15. The electronic buffer 19 is an element connected to the N input terminals 11. The output terminal 21 is an element connected to the plurality of delay lines 17 and the electronic buffer 19. The buffer control unit 23 is an element connected to the optical packet information acquisition unit 13 and that controls a connection relationship between the N input terminals 11 and the plurality of switches 15, a connection relationship between the N input terminals 11 and the electronic buffer 19, and a connection relationship between the plurality of switches 15 and the plurality of delay lines 17.

Amounts of delay of fiber delay lines in the plurality of delay lines 17 are different from each other.

The buffer control unit 23 receives packet information and analyzes packet traffic. The buffer control unit 23 performs control in such a manner that the electronic buffer 19 is not used in a case where the packet traffic is a first threshold or less. Also, the buffer control unit 23 receives information related to a use state of delay lines and performs control in such a manner that the electronic buffer 19 is not used in a case where a use rate of the delay lines (percentage of used delay line to number of all delay line) is a first threshold related to the use rate or less.

Figure 2:
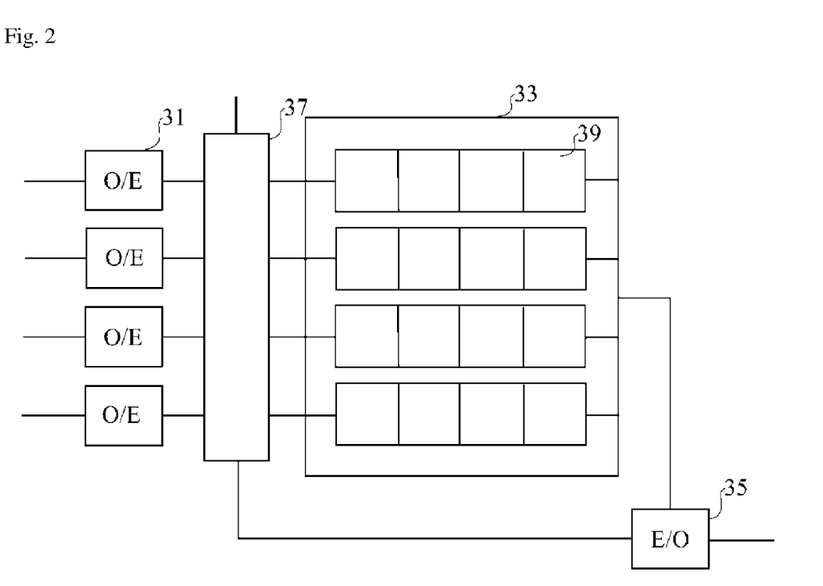
FIG. 2 is a block diagram illustrating a configuration example of an electronic buffer.

The electronic buffer 19 preferably includes N O/E conversion receivers 31, a memory 33, and an E/O conversion transmitter 35. There is one or a plurality of E/O conversion transmitters 35 in the electronic buffer. The N O/E conversion receivers 31 are elements respectively corresponding to the N input terminals 11. The memory 33 is an element connected to each of the N O/E conversion receivers 31. The one or plurality of E/O conversion transmitters 35 is an element connected to the output terminal 21 and that converts an electric signal read from the memory 33 into an optical signal.

In this case, the buffer control unit 23 grasps a congestion state of each of the input terminals 11 based on packet information of each of the N input terminals 11 and controls a state of a storage area included in an electronic buffer, which is connected to each of the input terminals 11, based on the grasped congestion states. Also, the buffer control unit 23 may control a state of the storage area included in the electronic buffer based on a use state of the delay lines.

A preferable example of the buffer control unit 23 is what performs control in such a manner that the electronic buffer 19 becomes an operation preparation state in a case where packet traffic is a first threshold or more and is a second threshold or less.

A preferable example of the buffer control unit 23 is what performs control in such a manner that at least one of the plurality of delay lines 17 is not used in a case where an optical packet input from any of the N input terminals 11 is input into the electronic buffer 19.

Advantageous Effects of Invention

In an optical delay line and an electronic buffer merged-type optical packet buffer control device of the present invention, an electronic buffer is provided along with an optical delay line buffer. The electronic buffer is used supplementarily in a case where congestion occurs, whereby it is possible to extend a buffer capacity. In a normal period, the electronic buffer is not used or the minimum storage area necessary is used according to buffer occupancy, whereby it is possible to control power consumption.

BRIEF DESCRIPTION OF DRAWINGS

FIGS. 5(a) to 5(c) are conceptual diagrams illustrating a behavior of an optical delay line buffer.

DESCRIPTION OF EMBODIMENTS

In the following, embodiments of the present invention will be described with reference to the drawings. The present invention is not limited to embodiments described in the following and includes the following embodiments that are arbitrarily modified in the scope obvious to those skilled in the art.

A first aspect of the present invention relates to an optical delay line and an electronic buffer merged-type optical packet buffer control device. The optical packet buffer control device includes a mechanism of giving (or not giving) appropriate delays to a plurality of optical packets and preventing collision when it relays the optical packets. The optical packet buffer control device is provided, for example, it becomes a router connecting between nodes.

FIG. 1 is a block diagram illustrating a basic configuration example of an optical delay line and an electronic buffer merged-type optical packet buffer control device of the present invention. As illustrated in FIG. 1, the device of the present invention includes N input terminals 11, an optical packet information acquisition unit 13, a plurality of switches 15, a plurality of delay lines 17, an electronic buffer 19, an output terminal 21, and a buffer control unit 23. N is an integer number of two or larger.

Each of the input terminals 11 is an element that inputs an optical packet. Each of the input terminals 11 is connected to a transmission line such as an optical fiber. Then, an optical signal (such as optical packet signal) which is outputted from an optical fiber passes through the input terminals 11 and is input into an optical buffer (or electronic buffer). The input terminals 11 are conceptual and are not necessarily objects different from a waveguide.

The optical packet information acquisition unit 13 is an element connected to N input terminals 11 and that acquires packet information related to an optical packet. The optical packet information acquisition unit 13 corresponds to one or both of a reader and an optical packet detector in Patent Literature 1. A mechanism that receives an optical packet and reads information included in the optical packet in such a manner is known. An optical packet generally includes a header and a payload. Examples of packet information are a rate (number) of arrivals of optical packets, a source and destination addresses included in a header of an optical packet, and data included in a payload. In order to measure the arrival rate of optical packets, a photodetector included in the optical packet information acquisition unit 13 may calculate the number of received optical packets in a predetermined period.

The plurality of switches 15 is an element connected to the N input terminals 11. These switches 15 control which delay line (or electronic buffer) processes an optical packet. These optical switches 15 perform the above control processing according to a control signal from the buffer control unit 23.

An example of the plurality of switches 15 is what divides intensity of an optical packet with an optical distributor (splitter), transmits the optical packet to a predetermined delay line (or delay line group), transmits the optical packet also to the electronic buffer, and then controls which delay line or electronic buffer is to be used. In this case, it is controlled based on a control signal from the buffer control unit 23 whether an optical packet is transmitted to a predetermined optical delay line or electronic buffer. Note that in such a mode, an optical distributor (splitter) may be provided at a position of the input terminals 11 in FIG. 1. As described later, amounts of delay of fiber delay lines in the plurality of delay lines 17 are different from each other. Thus, the buffer control unit 23 calculates an amount of delay is to be given and determines to which delay line (or electronic buffer) an optical packet input to a certain input terminal is to be transmitted. And then, transmits a control signal to the switches 15. In such a manner, the switches 15 transmit an optical packet to an appropriate buffer and give an intended delay (or does not give delay), whereby a collision of an optical packet is prevented.

Each of the plurality of switches 15 may be what includes the input terminals 11 and a branching line, which can be connected to all delay lines and an electronic buffer, and controls a path, in which an optical packet propagates, based on a control signal from the buffer control unit 23.

The plurality of delay lines 17 is an element respectively connected to the plurality of switches 15. Each of the delay lines 17 may be connected to all of the switches 15. Amounts of delay of the delay lines are different from each other. A detailed example of delay lines is delay lines including the same material and having different lengths. As an optical delay line, what is in a conventional optical packet buffer device can be arbitrarily employed.

The electronic buffer 19 is an element connected to the N input terminals 11. The electronic buffer 19 is an element that converts an optical packet into an electric signal, stores the converted signal in a memory, gives a predetermined amount of delay, performs conversion into an optical signal, and performs an output to an output terminal. As the electronic buffer 19, an electronic buffer included in a conventional router or the like can be used.

The electronic buffer 19 may include one or a plurality of memories (chip) connected to each of the input terminals 11 or the plurality of input terminals 11 may be connected to a certain memory (chip). The buffer 19 is preferably includes a plurality of memory elements and is controlled into a state such as (1) a stopped state, (2) a used or operated state, or (3) a use or operation preparation state in each of certain areas.

FIG. 2 is a block diagram illustrating a configuration example of an electronic buffer. As illustrated in FIG. 2, the electronic buffer 19 preferably includes the N O/E conversion receivers 31, the memory 33, and the E/O conversion transmitters 35. The N O/E conversion receivers 31 are elements respectively corresponding to the N input terminals 11. An optical packet passing through the input terminals 11 to the O/E conversion receivers 31 is converted into an electronic signal in the O/E conversion receivers 31 and transmitted to the memory 33. The memory 33 is an element connected to each of the N O/E conversion receivers 31. The memory 33 stores the electronic signal and outputs the electronic signal to the one or plurality of E/O conversion transmitter 35 according to a control signal. Each E/O conversion transmitter 35 is an element connected to the output terminal 21 and that converts an electric signal read from the memory 33 into an optical signal. Then, the E/O conversion transmitter 35 outputs the converted optical signal to the output terminal 21.

As illustrated in FIG. 2, this electronic buffer may include a memory control unit 37 connected to the O/E conversion receivers 31 and the buffer control unit 23 and that controls a state of the memory according to a control signal from the buffer control unit.

Also, the memory 33 may include a plurality of areas 39. These areas 39 are virtual and the plurality of O/E conversion receivers 31 may be connected to one chip. Also, one chip may be connected to each of the O/E conversion receivers 31. Also, sizes of the areas are not constant and can be changed flexibly according to traffic or a use state (use rate) of the delay lines.

The output terminal 21 is an element connected to the plurality of delay lines 17 and the electronic buffer 19. The output terminal 21 may include a connecting tool (such as coupler). Then, the output terminal 21 outputs an optical signal (optical packet signal) transmitted from the delay lines 17 and the electronic buffer 19.

The buffer control unit 23 is an element connected to the optical packet information acquisition unit 13 and that controls a connection relationship between the N input terminals 11 and the plurality of switches 15, a connection relationship between the N input terminals 11 and the electronic buffer 19, and a connection relationship between the plurality of switches 15 and the plurality of delay lines 17. Also, the buffer control unit 23 is preferably what is connected to each of the delay lines and can grasp a use state of the delay lines.

The buffer control unit 23 receives packet information and analyzes packet traffic. In a case where the packet traffic is a first threshold related to the traffic or less, the buffer control unit 23 performs control in such a manner that the electronic buffer 19 is not used. Also, a use state of the delay lines may be grasped and control may be performed in such a manner that the electronic buffer 19 is not used in a case where a use rate of the delay lines is a first threshold related to the use rate or less.

A preferable example of the buffer control unit 23 is what controls the electronic buffer 19 into an operation preparation state in a case where packet traffic is the first threshold related to the traffic or more and is a second threshold related to the traffic or less. In this example, the buffer control unit 23 controls the electronic buffer 19 into the operation preparation state in a case where a use rate of the delay lines is the first threshold related to the use rate or more and is a second threshold related to the use rate or less. As described above, the buffer control unit 23 may acquire information related to the use state of the delay lines and may control starting/stopping of an optical buffer or a state (use state (active state), use preparation state (hot state), and stopped state (cold state)) of the memory included in the optical buffer. In this case, the buffer control unit 23 previously stores a predetermined threshold, receives information related to a use state of the delay lines, performs comparison with the predetermined threshold, and outputs various control signals to the electronic buffer A preferable example of the buffer control unit 23 is what performs control in such a manner that at least one of the plurality of delay lines 17 is not used in a case where an optical packet input from any of the N input terminals 11 is input into the electronic buffer 19.

A preferable example of the buffer control unit 23 is what grasps a congestion state of each of the input terminals 11 based on packet information in each of the N input terminals 11 and controls a state of a storage area, which is included in the memory connected to each of the input terminals 11, based on the grasped congestion state.

A preferable example of the buffer control unit 23 is what includes an optical buffer control unit 25 that controls an optical buffer unit and an electronic buffer control unit 27 that controls an electronic buffer. Then, the electronic buffer control device is preferably monitors an output state of the optical delay line buffer constantly and transmits a packet when there is a longer void space than packet length at the head of the electronic buffer between continuously-outputted two packets.

EMBODIMENT

First Reference Example

1. Optical Delay Line Buffer 1.1. Packet Communication in Optical Integrated Network An optical packet switch function using an optical delay line buffer will be described with an optical packet and circuit integrated network node, which is disclosed in the following literature, as an example.

(Literature: H. Furukawa, T. Miyazawa, N. Wada, and H. Harai, "Moving the Boundary between Wavelength Resources in Optical Packet and Circuit Integrated Ring Network," Optics Express, vol. 22, no. 1, pp. 47-54, January 2014.)

Figure 3:
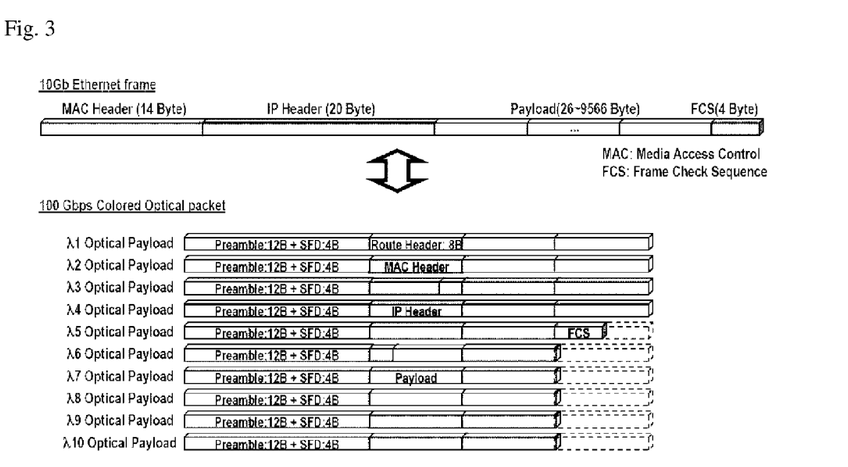
FIG. 3 is a conceptual diagram illustrating an Ethernet (registered trademark) frame and an optical packet conversion.

An Ethernet (registered trademark) frame arriving from an external network at an edge node is divided into 10 and each thereof is encapsulated in an optical packet and transferred. FIG. 3 is a conceptual diagram illustrating an Ethernet (registered trademark) frame and an optical packet conversion. The Ethernet (registered trademark) frame in this example includes a MAC header, an IP header, a payload, and a FCS (frame check sequence). In this example, communication of 10 Gbps is performed at one wavelength and communication of 100 Gbps is realized by multiplex transfer at 10 wavelengths. In this example, a route header which has 8 bytes and in which information of a transmission/reception node or the like is described is added to a head of a packet at one wavelength. A node in an integrated network reads the information described in the route header and selects an adjacent node to which a packet is subsequently given.

An N×N optical packet switch includes N 1×N switches and an N input 1 output optical delay line buffer with B delay lines that are connected to each other in a full mesh manner.

Figure 4:
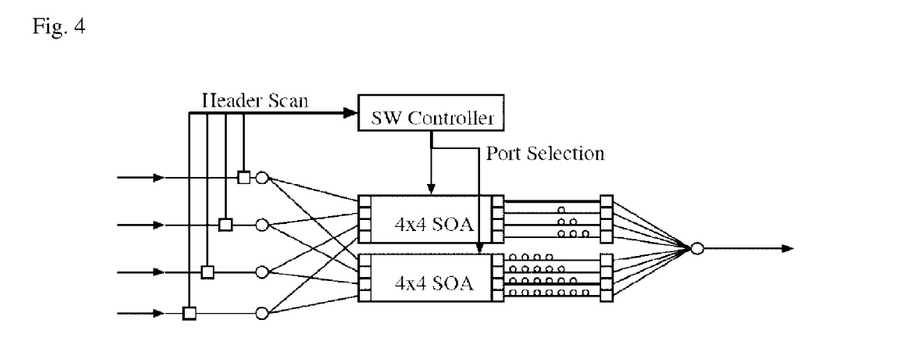
FIG. 4 is a block diagram illustrating a configuration example of a 4 input 1 output buffer with 8 delay lines (N=4, B=8).

FIG. 4 is a block diagram illustrating a configuration example of a 4 input 1 output buffer with 8 delay lines (N=4, B=8). For example, in a case of a 4×4 output switch, 4 optical delay line buffers are mounted. In each input port, a route header of a packet that arrives at the optical packet switch is read and a switch controller (SW Controller in drawing) selects an output port.

Delay time given to avoid a packet collision is calculated based on algorithm described in the following literature.

(Literature: H. Harai and M. Murata, "High-Speed Buffer Management for 40 Gb/s-Based Photonic Packet Switches," IEEE/ACM Transactions on Networking, vol. 14, pp. 191-204, February 2006.)

Figure 5:
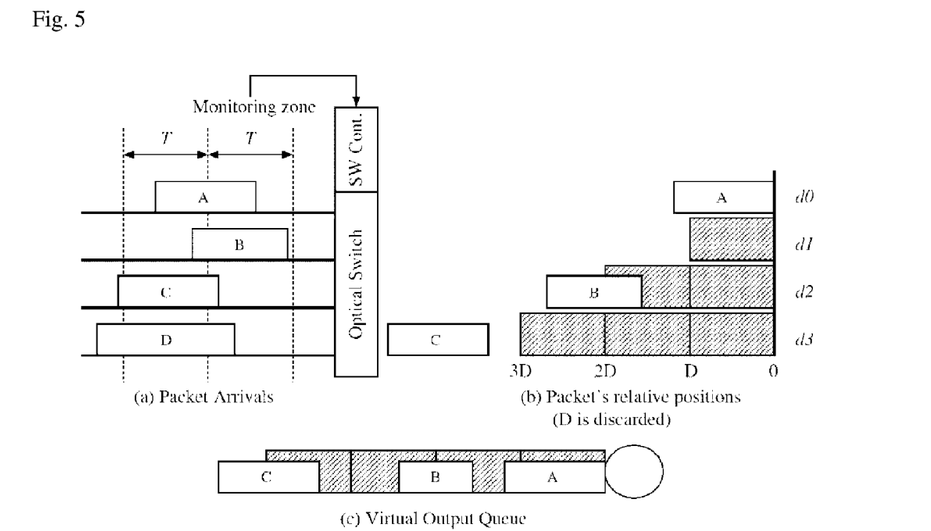
FIG. 5(a) is a view illustrating a state in packet arrival.
FIG. 5(b) is a view illustrating a relative position of a packet.
FIG. 5(c) is a view illustrating an example of a logical positional relationship of an output from the optical delay buffer.

By utilization of these results, to which port and through which delay line a packet is output is determined. The B delay lines give discrete delays of 0, D, 2D, ..., and (B−1)D with a length D[ns] as a unit length. An operation example of when a plurality of packets that arrives at a certain output port avoids a collision through a delay line buffer is illustrated in FIGS. 5(a) to 5(c). FIGS. 5(a) to 5(c) are conceptual diagrams illustrating a behavior of an optical delay line buffer. FIG. 5(a) is a view illustrating a state in packet arrival. FIG. 5(b) is a view illustrating a relative position of a packet. FIG. 5(c) is a view illustrating an example of a logical positional relationship of an output from the optical delay buffer. In a 4 input buffer with 4 delay lines (N=4, B=4), it is assumed that 4 packets arrives at certain time as illustrated in FIG. 5(a). Here, time T indicates a cycle in which a controller observes an arrival state of a packet (inner clock frequency is 1/T) and T should be shorter than a minimum packet length. The controller acquires packet arrival time and a packet length, determines delay lines through which arrived packets pass in order of ports 1, 2, ..., and N, and switches an output destination of an optical packet. In a case where a delay is given to each of the arrived packets as illustrated in FIG. 5(a), a relative position of the packets immediately after a packet A arrives at a delay line d0 is as illustrated in FIG. 5(b). Three packets from A to C are output without a collision and a packet D is rejected. In FIG. 5(c), a logical position of an output from the optical delay line buffer is illustrated. As illustrated in the drawing, a void is generated in the output due to a discrete characteristic of the optical delay line buffer.

1.2. Performance Evaluation of Optical Delay Line Buffer

In order to evaluate an influence of the number of delay lines B in the optical delay line buffer on performance of a network, a function of an optical packet switch such as an optical delay line buffer is implemented in a network simulator ns-3 and simulation evaluation is performed.

1.2.1. Simulation Environment

Figure 6:
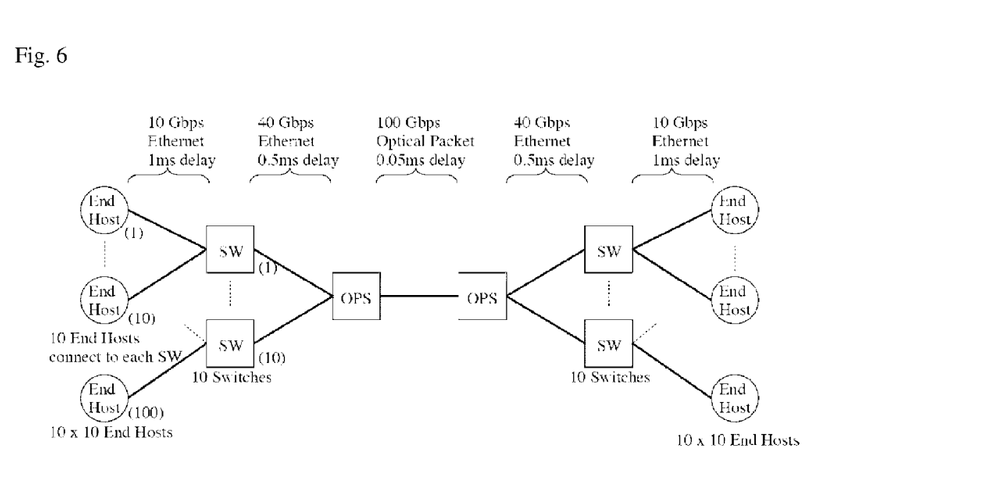
FIG. 6 is a block diagram illustrating a construct of dumbbell-type topology.

First, topology used in the simulation, setting of each parameter, and a traffic model are described. As network topology, dumbbell-type topology illustrated in FIG. 6 is used. FIG. 6 is a block diagram illustrating a construct of the dumbbell-type topology. 10 Ethernet (registered trademark) switches are connected to each end of a switch connected by an optical packet line of 100 Gbps. To each Ethernet (registered trademark) switch, 10 terminals are connected. To each end of topology, 100 terminals are connected. The terminals and Ethernet (registered trademark) switches are connected by a line with a propagation delay of 1 ms and a line speed of 10 Gbps and the Ethernet (registered trademark) switches and the optical packet switch are connected by a line with a propagation delay of 0.5 ms and a line speed of 40 Gbps, an MTU of each being 1500 Bytes. A minimum packet length is 64 Bytes and is 19.2 ns when being converted into an optical packet. Thus, a cycle of observation T of the optical packet switch is 19 ns. A unit length D of the delay lines is 100 ns. Note that a traffic generation model is evaluated by utilization of a UDP and a TCP.

Evaluation by UDP Traffic

A flow of 1 Gbps is generated at time [0, 0.5] according to Poisson process of an arrival rate $\lambda$ (flow/second). A combination of transmission/reception terminals is randomly selected from terminals and traffic flows from a terminal at a left end in the drawing to a terminal at a right end.

Evaluation by TCP Traffic

TCP NewReno is used as a flow control protocol. A point that a flow is generated according to Poisson process of an arrival rate $\lambda$ is similar to a case of the UDP. However, flows of flowing traffic from a terminal at a left end to a terminal at a right end or from the terminal at the right end to the terminal at the left end are simultaneously generated and various sizes of packets pass trough the bottleneck. Also, an upper limit of a transfer amount of each flow is defined on the assumption of a file transfer. A Pareto distribution with $\alpha=0.5$ and $X_m=90$ is used in such a manner that an average in generation of a flow becomes around 780 KBytes. A simulation period is 5 seconds. Also, a transfer amount of flows generated at time [0, 0.01] is set to be unlimited and these flows keep sending background traffic.

Figure 7:
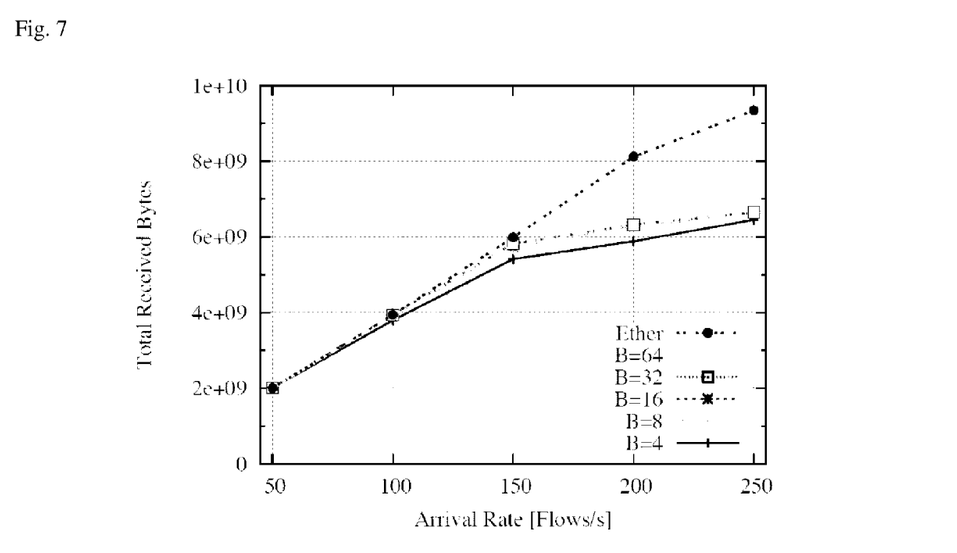
FIG. 7 is a graph illustrating the total number of received bytes (UDP) of a terminal.

1.2.2. Number of Delay Lines of Optical Delay Line Buffer and Network Performance In the above simulation environment, a performance evaluation is performed with the number of delay lines B being 4, 8, 16, 32, and 64. Also, a performance evaluation (Ether) in a case where an OPS part of the dumbbell-type topology is replaced with an Ethernet (registered trademark) switch of 100 Gbps is simultaneously performed for comparison. Here, a buffer capacity of a switch of 100 Gbps is 20.48 KBytes equivalent to that of a delay line with a length of 63 D and a packet is stored in a FIFO/DropTail system. Also, a packet processing delay is set to be 2T=38 ns on the assumption that high-speed processing equivalent to that of an optical delay line buffer can be performed. A relationship between a flow arrival rate $\lambda$ and an amount of data received by a terminal under total number of received bytes (UDP) traffic is illustrated in FIG. 7. FIG. 7 is a graph illustrating the total number of received bytes (UDP) of a terminal. In FIG. 7, an X-axis indicates a flow arrival rate and a Y-axis indicates the total number of bytes of a packet received by a terminal at a right end. When a flow is generated at time [0, 0.5], a flow of $\lambda/2 \times 1$ Gbps flows into a bottleneck link. When $\lambda$ equals 200, a flowing flow becomes 100 Gbps. On the other hand, in a stage in which $\lambda$ exceeded 150, many packets are rejected and a transfer amount of an optical packet switch is not increased. Although a transfer amount is increased for about 10% when the number of delay lines is increased from 4 to 8, the transfer amount is hardly increased even when the number is increased to 16 or more. Thus, there is a large difference from a transfer amount of the Ethernet (registered trademark) switch.

Figure 8:
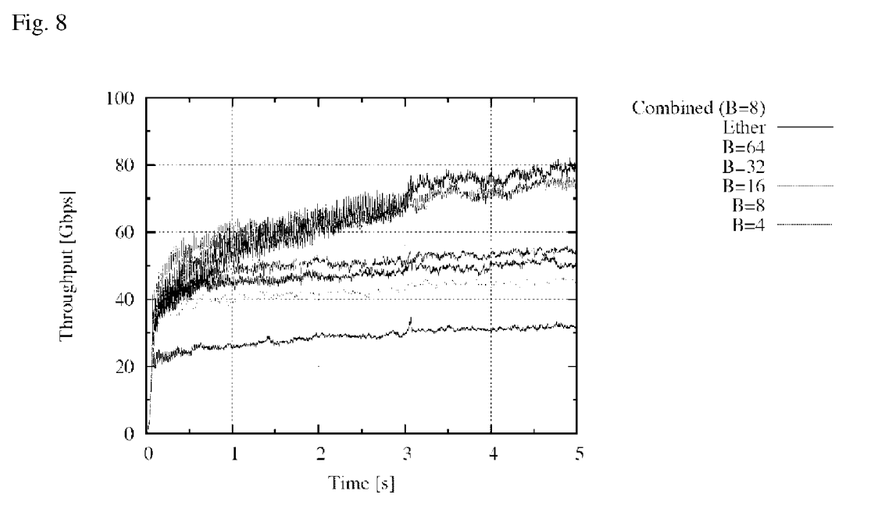
FIG. 8 is a graph illustrating a line throughput in one direction in a bottleneck link in a case where a flow arrival rate is $\lambda=10^5$.
Figure 9:
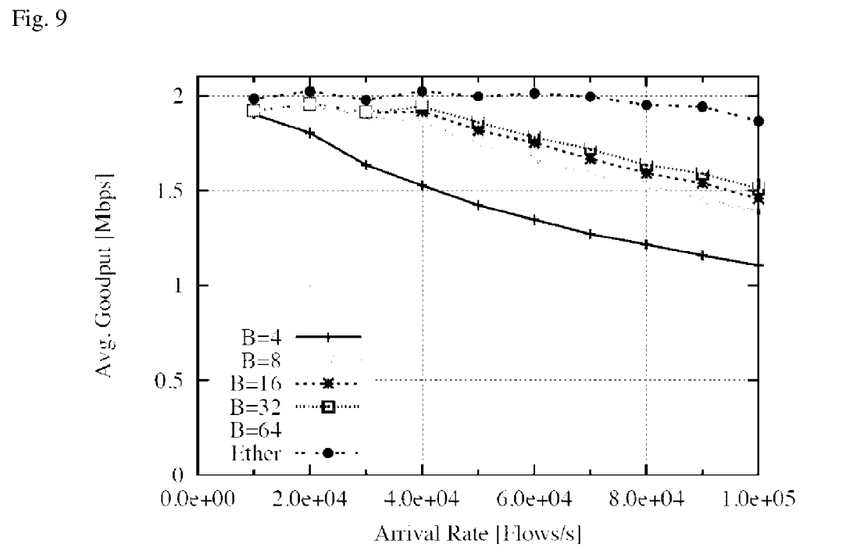
FIG. 9 is a graph illustrating an average value of a goodput (throughput in application layer level) of a TCP flow with respect to a flow arrival rate.

Under the UDP traffic, packets constantly arrive and the most of packets are stored only in the longest delay line or its peripherals. Thus, an increase in the number of delay lines is not directly connected to improvement in performance. Similarly, in communication by the TCP, although improvement in the performance can be realized by an increase in delay lines, the performance is low compared to a case of the Ethernet (registered trademark) switch. FIG. 8 is a graph illustrating a line throughput in one direction in a bottleneck link in a case where a flow arrival rate is $\lambda=10^5$. FIG. 9 is a graph illustrating an average value of a goodput (throughput in application layer level) of a TCP flow with respect to a flow arrival rate. Note that a goodput of a TCP flow generated in a period is measured as an object. When the number of delay lines is increased from 4 to 8, a line throughput increases about 1.5 times higher and an average goodput increases about 1.3 times higher. However, when the number of delay line is increased to 16 or more, a degree of improvement in performance is small compared to a case where the number of delay lines is increased from 4 to 8. A line throughput is about 60 Gbps even in a case where the number of delay lines is 64. Under the TCP traffic, many small packets such as ACK packets also arrive. An excessive delay is likely to be given to these due to a discrete characteristic of the optical delay line buffer and use efficiency of an output line is decreased. A difference from performance of the Ethernet (registered trademark) switch is increased as a flow arrival rate is increased. As a traffic load becomes high, it is difficult to acquire performance close to that of the Ethernet (registered trademark) switch.

First Embodiment

1. Optical and Electronic Merged-Type Buffer

In the first reference example, it is indicated that communication performance of an optical packet switch is increased when the number of delay lines B of an optical delay line buffer is increased. On the other hand, it is also indicated that it is difficult to acquire performance, which is equivalent to that of an Ethernet (registered trademark) switch at high speed, only with a several tens of delay lines. As described above, it is considered that expansion of an optical delay line buffer is difficult in economic and technological view. Thus, we are aiming to improve performance of an optical packet buffer with a combination of an optical delay line buffer and an electronic buffer with a low price.

A system of expanding housing capacity and reducing power consumption by combining buffers with different characteristics has already been discussed. In the following literature, a system of keeping low power consumption and reducing a packet rejection by using a low power consumption/low capacity buffer in a normal period and using a high power consumption/high capacity buffer in generation of congestion in an ONU of a GE-PON is proposed.

(Literature: H. Uzawa, K. Terada, N. Ikeda, A. Miyazaki, M. Urano, and T. Shibata, "Energy-efficient Frame-buffer Architecture and It's Control Schemes for ONU Power Reduction," in Proceedings of IEEE GLOBECOM, December 2011.)

When two kinds of buffer are combined and are used appropriately, it is possible to expand packet housing capacity with an electronic buffer while making use of characteristics, such as low delay and low power consumption, of an optical delay line buffer.

1.1. Sliced Memory Buffer

By increasing/decreasing the number of working areas in an electronic memory when necessary, it is possible to decrease power consumption of an electronic buffer. In order to decrease power consumption of a merged-type buffer, it is necessary to control standby power of an electronic buffer in a non-operational period as low as possible.

Thus, it is preferable that a working area of an electronic memory can be controlled and transition time of starting/stopping is short. In a sliced memory proposed in the following literature, a memory is divided into a plurality of slices and a power supply is controlled separately for each slice, whereby an effective operation of the memory is realized. In the sliced memory, each slice transitions in the following three states.

(Literature: K. Okuda, S. Ata, Y. Kuroda, Y. Yano, I. Iwamoto, K. Inoue, and I. Oka, "2D Sliced Packet Buffer with Traffic Volume and Buffer Occupancy Adaptation for Power Saving," in Proceedings of Consumer Communications and Networking Conference, pp. 97-105, January 2013.)

An active (Act.) state: a state in which writing/reading is possible and power consumption is high.

A hot (hot standby) (Hot) state: a CLK input is blocked and standby power is controlled to 43% of that in the Act. state. A state in which transition to the Act. state can be performed in 1 μs.

A cold (cold standby) (Cold) state: a state in which supplying of power is blocked and 100 μs is necessary for transition to the Hot state although power consumption is zero.

Immediate transition from each of the Act. and Hot states to the Cold state is possible.

For example, it becomes possible to control a capacity of a memory by controlling a state in a slice unit, for example, by switching an area in the Hot state to Act. when an area in the Act. state is in short and by switching a part of an area of Act. to Hot when occupancy of the memory is decreased. By focusing on a flexible power supply control function at high speed of the sliced memory, the sliced memory is embedded into an electronic memory of an optical and electronic merged-type buffer.

1.2. Configuration and Operation Outline of Merged-Type Buffer

Figure 10:
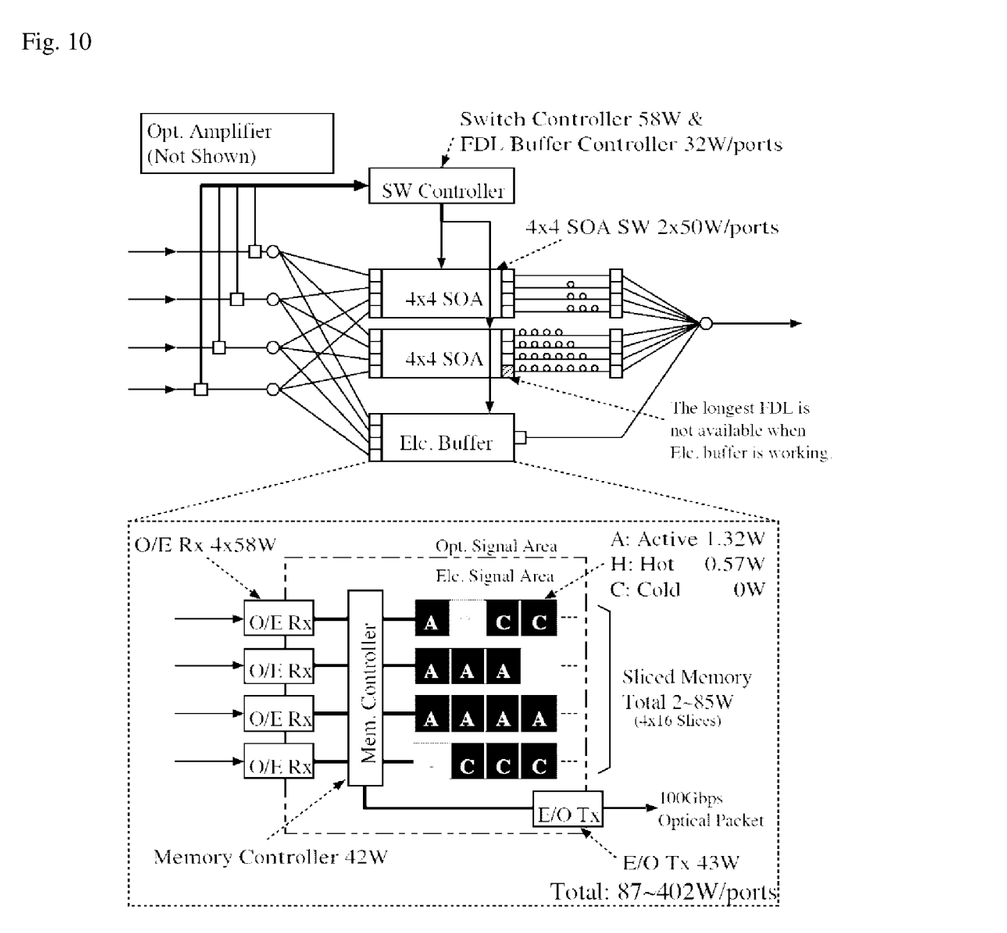
FIG. 10 is a block diagram illustrating a configuration example of a merged-type buffer.

An optical and electronic merged-type buffer is configured by addition of an electronic buffer to the optical delay line buffer in FIG. 4 (FIG. 10). FIG. 10 is a block diagram illustrating a configuration example of a merged-type buffer. In the merged-type buffer, an output from the optical delay line buffer and an output from the electronic buffer are coupled by an optical coupler and transmitted to an adjacent node. There is a limit in the number of input signals that can be coupled by the coupler. Thus, control is preferably performed in such a manner that one of delay lines, which one in this case is a delay line having the longest length, is not used when the electronic buffer is started. Accordingly, it is possible to realize a buffer function effectively even when a coupler with a relatively low price is used. In a case where performance of a coupler is very high, all delay lines may be used even when the electronic buffer is activated.

An electronic buffer part includes, for example, parts in a lower part in FIG. 10 and includes an O/E conversion receiver and a sliced memory corresponding to each input port. A size of an Act. area of each memory, that is, a memory capacity is switched according to a congestion state of each port. A memory controller manages packets in the FIFO manner and outputs a packet through the E/O conversion transmitter when a void is generated in an output from the optical delay line buffer.

In the merged-type buffer, the optical delay line buffer is used and the electronic buffer is not used in a normal period. In the period, it is possible to block power supplied to the electronic buffer and to reduce power consumption. It is also possible to reduce power supplied to a receiver or a transmitter and it is expected to further reduce power consumption. However, a state transition period from Cold to Act. is long and is 101 µs in the sliced memory. Thus, it is not possible to respond to a sudden increase in traffic. Thus, the electronic buffer performs waiting while keeping at least one slice in the Hot state.

When congestion occurs, the merged-type buffer expands a packet housing capacity by starting and using the electronic buffer. Delay characteristics of the optical delay line buffer and the electronic buffer are different. A delay of the optical delay line buffer is low compared to the electronic buffer. Thus, when packets are randomly distributed to the optical delay line buffer and the electronic buffer, inversion of order may occur. Specifically, in a protocol, which decreases a transmission rate by detection of duplicate ACK, such as TCP Reno or NewReno, a throughput is decreased when order is inverted. Thus, it is preferable that it is determined in a flow unit which of the optical delay line buffer and the electronic buffer is to be used and a used buffer is fixed, a whole certain flow being distributed to the optical delay line and a whole the other flow being distributed to the electronic memory, for example. In a route header of an optical packet, information of a transmission/reception node is described. By using this, it is possible to switch a used buffer in a flow unit.

In the optical delay line buffer, delays given to packets are discrete and it is not possible to perform fine adjustment of transmission timing of a packet. Thus, output timing is adjusted on a side of the electronic buffer and a collision of an output from the optical delay line buffer and that from the electronic buffer is avoided. Originally, an optical delay line buffer control device manages packet arrival time in each input port, a packet length, and a given delay. A buffer control unit (specifically, electronic buffer control unit) of the present invention can grasp a state of an output from the optical delay line buffer based on these pieces of information. The electronic buffer control unit constantly monitors an output state of the optical delay line buffer and transmits a packet when there is a blank longer than a packet length at a head of the electronic buffer.

When congestion is solved and a state in which occupancy of the optical delay line buffer is low lasts, the merged-type buffer stops the electronic buffer and goes back to a state in which only the optical delay line buffer is used. Alternatively, the merged-type buffer may stop the electronic buffer unit when traffic becomes a threshold or less.

1.3. Power Consumption of Optical and Electronic Merged-Type Buffer

How much power is reduced compared to a case where the merged-type buffer described in the preceding section stores all packets in the electronic buffer will be calculated.

In FIG. 10, power consumption of each device is illustrated in addition to a configuration of the merged-type buffer. Power consumption of an optical device such as an O/E or E/O conversion transmitter/receiver is based on power consumption of parts included in the optical integrated network node described above. However, one current 4×4 SOA switch consumes power of 200 W. This is because power consumed in converting signals input in intervals of 100 GHz into signals in intervals of 400 GHz by an interleaver is included. In the future, there is possibility that power consumption can be reduced to about ¼ by reducing this. Power consumption of one SOA switch is set to 50 W in consideration of this point. Power consumption of the electronic memory is set to 85 W since a percentage of power consumption of a memory in that of a Cisco CRS line card is 19% and power consumption of a Cisco CRS-3 line card (140 Gbps, 1 GByte) is 446 W. Power consumption in a slice unit in a case where this is divided into 4 ports×16 slices is as illustrated in the drawing. Note that power consumption of a controller of the electronic memory is a half of that of the electronic memory.

In the following, first, power consumption of a 4×4 optical packet switch will be described. In Table 1, a detail and the total of maximum and minimum power consumption of the optical packet switch in a case where the merged-type buffer is used and a case where only the electronic buffer is used are illustrated.

TABLE 1

|  | Combined Buffer | | Electronic Buffer | |
| --- | --- | --- | --- | --- |
|  | Peak (W) | Idle (W) | Peak (W) | Idle (W) |
| SW Controller | 58 | 58 | 58 | 58 |
| Opt. Amplifier | 120 | 120 | 120 | 120 |
| SOA Switch | 100 × 4 | 100 × 4 | — | — |
| FDL Buffer Cont. | 32 × 4 | 32 × 4 | — | — |
| O/E Receiver | 232 × 4 | 0 × 4 | 232 × 4 | 232 × 4 |
| E/O Transmitter | 43 × 4 | 43 × 4 | 43 × 4 | 43 × 4 |
| Electornic RAM | 85 × 4 | 2 × 4 | 85 × 4 | 8 × 4 |
| Mem. Controller | 42 × 4 | 42 × 4 | 42 × 4 | 42 × 4 |
| Total | 2314 W | 1054 W | 1786 W | 1478 W |

In a case where all packets are housed only in the electronic buffer, it is possible to remove optical devices such as an SOA switch and an optical delay line buffer controller and to reduce power consumption. However, it is necessary to keep operating the O/E conversion receiver constantly and to keep 4 slices of the electronic memory in the Act. state and 4 slices thereof in the Hot state for preparation for a packet arrival. When these conditions are considered, power consumption of one electronic buffer is about 325 W. Since one optical packet switch includes 4 buffers, power consumption of the whole optical packet switch including an amplifier and the like is 1478 W at minimum and is 1786 W at maximum in a case where the whole memory is in the Act. state.

On the other hand, in the merged-type buffer, although the number of devices such as an SOA switch and a buffer controller are increased, it is possible to turn off the power of the O/E conversion receiver of the electronic buffer (transmitter is constantly started in consideration of period necessary for starting) and keeping only one slice of memory to be Hot with respect to each port is adequate. Thus, it is possible to reduce power consumption of the electronic buffer unit. Here, power consumption of the merged-type buffer is, in total of that of the optical delay line buffer unit and that of the electronic buffer unit, 219 W in a normal period and can be reduced to ⅔ of that in a case only the electronic buffer is used. However, power consumption of the merged-type buffer in a case where all electronic parts are started is 534 W and is higher than that of when only the electronic buffer is used.

As described above, an effect in reduction of power consumption in the merged-type buffer in a normal period is obvious. On the other hand, maximum power consumption in a case where all electronic buffer parts are used is 2314 W and is 1.3 times higher than that in a case where only the electronic buffer is used. However, it is considered that this problem can be solved by improving efficiency of an operation of the merged-type buffer. For example, when only one of the 4 merged-type buffers uses an electronic buffer unit, power consumption of the whole switch is 1369 W. That is, the merged-type buffer can be operated with power consumption lower than that in a case where only the electronic buffer is used as long as two or more merged-type buffers do not start electronic buffer units simultaneously. By minimizing utilization of an electronic buffer unit and by reducing simultaneously-activated pluralities of electronic buffer units as much as possible, it is possible to greatly reduce power consumption of the whole switch compared to that in a case where only the electronic buffer is used.

2. Performance Evaluation 2.1. Operation Model of Merged-Type Buffer

In order to indicate performance of the above-described merged-type buffer in which the optical delay line and the electronic memory are combined, evaluation by simulation is performed. In order to indicate a brief performance characteristic of the merged-type buffer, a very simple operation model is defined with respect to power supply control of the electronic buffer unit and control of switching the Act. state or the Hot state in an inner part of the sliced memory in the merged-type buffer and evaluation is performed. A power supply control model of the electronic buffer unit in the merged-type buffer is as follows.

Power Supply Control of Electronic Buffer Unit

When the number of used delay lines exceeds 50% of the total number of delay lines, the electronic buffer unit is activated. Note that in a case where the number of used delay lines exceeds a certain value of 30% of the total number of delay lines or larger and 80% thereof or smaller, the electronic buffer may be activated. Alternatively, the value may be a certain value of 40% or larger and 60% or smaller. It may be controlled according to the number of used delay lines whether to start to use the electronic buffer unit.

When a state in which the number of used delay lines is 25% of the total number of delay lines lasts for 1 ms, the electronic buffer is stopped. That is, when a state in which the number of used delay lines is 15% of the total number of delay lines or larger and 40% thereof or smaller lasts for 0.1 ms or longer and 3 ms or shorter or a state in which the number of used delay lines is 20% of the total number of delay lines or larger and 30% thereof or smaller lasts for 0.5 ms or longer and 2 ms or shorter after the electronic buffer unit is started, control may be performed in such a manner that the electronic buffer is stopped. As described, even after the electronic buffer is started once, control may be performed in such a manner that the electronic buffer is stopped in a case where a use rate of the delay lines is lower than a predetermined value or a period in which a use rate is lower than a predetermined use rate lasts for a predetermined period or longer.

State Control of Sliced Memory

In a case where a use rate of an Act. area exceeds 75%, transition of a Hot area (area in Hot state) to the Act. area is performed and transition of a Cold area having a size equal to that of the expanded Act. area to a Hot state is performed. Also, when a use rate of the Act. area is lower than 25%, transition of the Hot area to a Cold state is performed and transition of a half of the Act. area to Hot is performed. That is, until an upper limit of the number of slices is reached, the Act. area is expanded by twice each time the use rate exceeds 75% and the Act. area is reduced to a half each time the use rate becomes lower than 25%. The present invention can perform control in which the above detailed numeric value is read as a specific value or a specific range.

With respect to distribution of packets to the optical delay line or the electronic buffer in starting of the electronic buffer, a type of used buffer is fixed in a unit of an input port for simplification, that is, input ports 1 to 5 are fixed to the optical delay line buffer and ports 6 to 10 are fixed to the electronic buffer. This method is basically identical to a case where a used buffer is changed for each flow in a point that one flow always passes through the same buffer. The electronic buffer monitors a state of an output from the optical delay line buffer and adjusts output timing. In addition, dynamic queue control by random early detection (RED) in a unit of an input port is introduced for avoiding congestion. An optical packet is stored in the electronic buffer with a preamble and an SFD thereof being removed. Those are added again in an output from the electronic buffer.

2.2 Simulation Environment

As network topology, dumbbell-type topology identical to that in the first reference example is used. Evaluation in which a TCP model is used as a traffic model is performed and evaluation in a case where a flow arrival rate is increased/decreased in each two seconds is performed in order to check whether power control of the merged-type buffer can adequately respond to a variation in a traffic demand. An electronic memory in one port is about 1 MByte and is divided into 16 slices, a capacity of one slice being about 64 Kbytes. Also, there is a delay of 10.66 GBytes/s in reading/writing in the memory. Parameters of the RED are $\max_p=20\%$, $\text{mind,}=12.5\%$, $\max_{th}=80\%$, and $w_q=0.002$.

2.3 Throughput of Merged-Type Buffer

Figure 11:
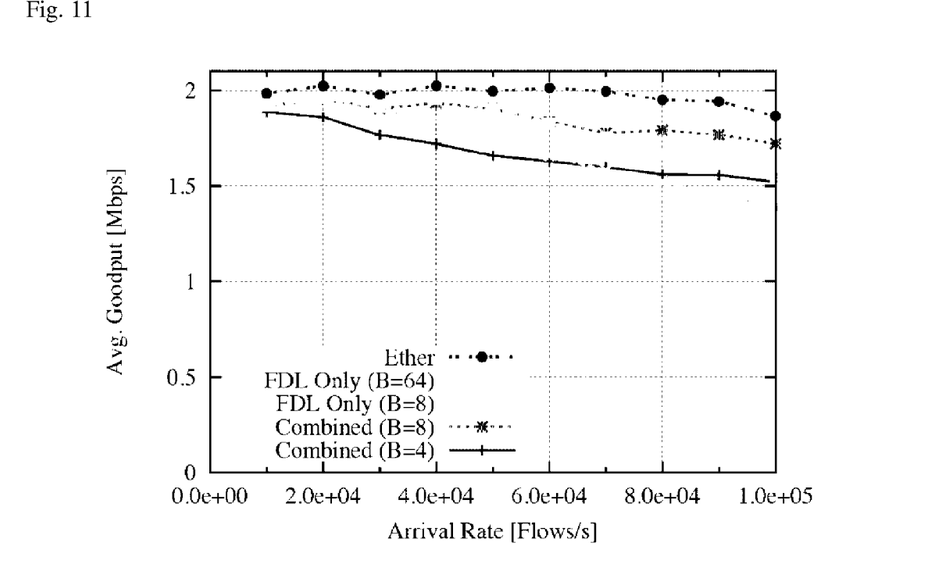
FIG. 11 is a graph illustrating a measured average goodput of a flow generated at certain time.
Figure 12:
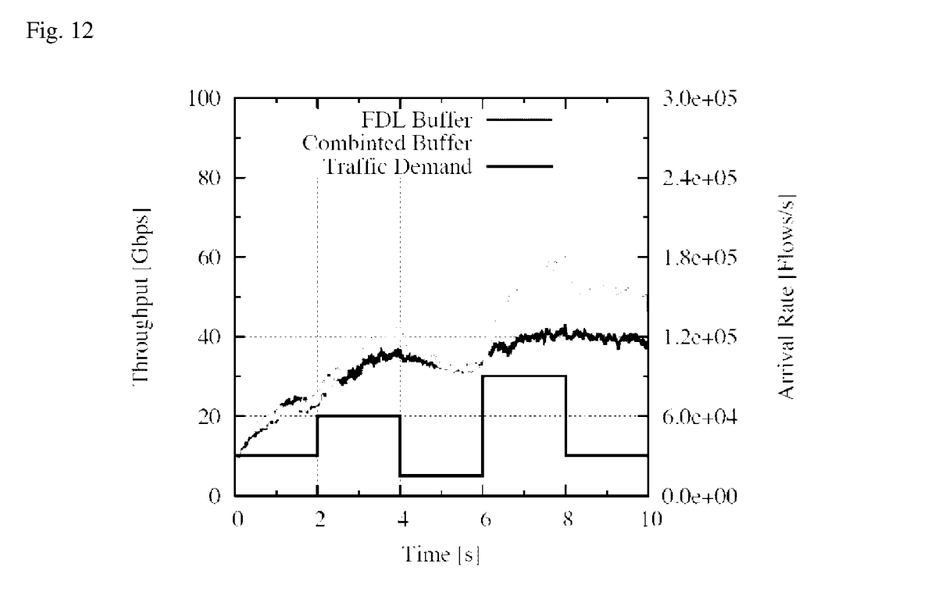
FIG. 12 is a graph in which output-line throughputs of the optical delay line buffer and the merged-type buffer are compared with each other in a state in which a flow arrival rate, that is, a traffic demand varies in every two seconds.

FIG. 11 is a graph illustrating an average goodput of the merged-type buffer in a case where a TCP model is used. FIG. 11 is a graph illustrating a measured average goodput of a flow generated at time [3, 4]. In FIG. 11, an X-axis and a Y-axis are similar to those in FIG. 9. Based on the drawing, an average goodput of a merged-type buffer in which an optical delay line buffer including 8 delay lines and an electronic buffer are combined is improved for about 20% in congestion (around $\lambda=8\times10^4$) compared to a case where only the optical delay line buffer is used. Moreover, here, an average goodput of the merged-type buffer is higher than a goodput of an optical delay line buffer including 64 delay lines. Thus, it can be said that improvement in a housing capacity which is not depending on increasing of the number of delay lines is realized in the merged-type buffer. Also, an output-line throughput in a case where $\lambda=10^5$ is improved to about 75 Gbps (FIG. 8) and this is about 70% of improvement of performance, compared to a case where only an optical delay line buffer with B=8 is used. On the other hand, the merged-type buffer has inferior performance compared to the Ethernet (registered trademark) switch specifically in congestion. However, it is considered that it is possible to solve this point by increasing a percentage of packets housed in the electronic buffer. Since power consumption of an electronic part is increased when reading/writing in the memory becomes more frequent, utilization of the electronic buffer is preferably reduced as much as possible. A use ratio of the optical delay line buffer and the electronic buffer is preferably adjusted according to a congestion state. FIG. 12 is a graph in which output-line throughputs of the optical delay line buffer and the merged-type buffer in a state in which a flow arrival rate, that is, a traffic demand varies in every two seconds are compared with each other. An X-axis indicates time, a Y-axis on the left indicates a throughput of an output line, and a Y-axis on the right indicates a flow arrival rate $\lambda$. At time [2, 4] and [6, 8], a flow arrival rate is increased and a traffic load is increased. However, the merged-type buffer can acquire a throughput higher than that of the optical delay line buffer. By combining two kinds of buffers, it is possible to reduce a rejection rate and to improve line use efficiency.

INDUSTRIAL APPLICABILITY

The present invention can be used in an optical information communication industry.

REFERENCE SIGNS LIST 11 input terminal
13 optical packet information acquisition unit
15 switch
17 delay line
19 electronic buffer
21 output terminal
23 buffer control unit
31 O/E conversion receiver
33 memory
35 E/O conversion transmitter

The invention claimed is:

1. An optical delay line and an electronic buffer merged-type optical packet buffer control device comprising:
    N input terminals in which an optical packet is input, wherein the N is integer number of 2 or larger;
    an optical packet information acquisition unit connected to the N input terminals and that acquires packet information related to the optical packet;
    a plurality of switches connected to the N input terminals;
    a plurality of delay lines respectively connected to the plurality of switches;
    an electronic buffer connected to the N input terminals;
    an output terminal connected to the plurality of delay lines and the electronic buffer; and
    an optical buffer control unit connected to the optical packet information acquisition unit and that controls a connection relationship between the N input terminals and the plurality of switches, a connection relationship between the N input terminals and the electronic buffer, and a connection relationship between the plurality of switches and the plurality of delay lines,
    wherein amounts of delay of the plurality of delay lines are different from each other, and
    the buffer control unit receives the packet information, analyzes packet traffic, and performs control in such a manner that the electronic buffer is not used in a case where the packet traffic is a first-traffic-threshold, which is a first threshold related to traffic, or less or in a case where a use rate of the delay lines is a first-use-rate-threshold, which is a first threshold related to a use rate, or lower;
    wherein the electronic buffer includes:
    N O/E conversion receivers respectively corresponding to the N input terminals;
    a memory connected to each of the N O/E conversion receivers; and
    one or a plurality of E/O conversion transmitters that convert an electric signal read from the memory into an optical signal, and
    wherein the buffer control unit grasps a congestion state of each of the input terminals based on the packet information or the use rate of the delay lines in each of the N input terminals and controls a state of a storage area included in the electronic buffer connected to each of the input terminals based on the grasped congestion state.

2. The device according to claim 1, wherein the buffer control unit performs control in such a manner that the electronic buffer becomes an operation preparation state in a case where the packet traffic is the first-traffic-threshold or more and a second-traffic-threshold, which is a second threshold related to the traffic, or less or in a case where the use rate of the delay lines is the first-use-rate-threshold or higher and a second-use-rate-threshold, which is a second threshold related to the use rate, or lower.

3. The device according to claim 1, wherein the buffer control unit performs control in such a manner that at least one of the plurality of delay lines is not used in a case where an optical packet input from any of the N input terminals is input into the electronic buffer.

* * * * *